(12) United States Patent
Burrows

(10) Patent No.: US 10,716,430 B2
(45) Date of Patent: Jul. 21, 2020

(54) DEVICES AND METHODS FOR BEVERAGE BREWER REGULATION

(71) Applicant: Coffee Solutions, LLC, Portland, OR (US)

(72) Inventor: Bruce D. Burrows, Valencia, CA (US)

(73) Assignee: COFFEE SOLUTIONS, LLC, Portland, OR (US)

( * ) Notice: Subject to any disclaimer, the term of this patent is extended or adjusted under 35 U.S.C. 154(b) by 0 days.

(21) Appl. No.: 15/549,106

(22) PCT Filed: Feb. 5, 2016

(86) PCT No.: PCT/US2016/016884
§ 371 (c)(1),
(2) Date: Aug. 4, 2017

(87) PCT Pub. No.: WO2016/127126
PCT Pub. Date: Aug. 11, 2016

(65) Prior Publication Data
US 2018/0014689 A1 Jan. 18, 2018

Related U.S. Application Data

(60) Provisional application No. 62/112,627, filed on Feb. 5, 2015, provisional application No. 62/199,941, filed on Jul. 31, 2015.

(51) Int. Cl.
*A47J 31/56* (2006.01)
*A47J 31/52* (2006.01)

(52) U.S. Cl.
CPC ........... *A47J 31/56* (2013.01); *A47J 31/5253* (2018.08)

(58) Field of Classification Search
CPC .................. A47J 31/24; A47J 31/402
See application file for complete search history.

(56) References Cited

U.S. PATENT DOCUMENTS 7,650,247 B2 * 1/2010 Leveque ............... F04B 49/065
 318/103
8,739,687 B1 6/2014 Tackland
(Continued)

FOREIGN PATENT DOCUMENTS

EP 2409608 1/2012

OTHER PUBLICATIONS

International Search Report, International application No. PCT/US2016/016884, dated Apr. 14, 2016.

*Primary Examiner* — Patrick Hamo

(57) ABSTRACT

The method for regulating pressure in a beverage brewer as disclosed herein includes initiating a brew cycle, which initiates a feedback loop. A temperature sensor monitors the water temperature in a heater tank, and one or more heating elements activate to heat the water to the appropriate temperature if necessary. An ammeter monitors the amperage of an electric current drawn by a pump. If the amperage is above a current ceiling, a voltage regulator reduces the voltage of electric current supplied to the pump, thereby reducing the pressure in the brew cartridge. The voltage regulator increases the voltage of electric current supplied to the pump to increase pressure in brew cartridge if the amperage of the electric current is below a current floor. Once the voltage regulator adjusts the voltage, the ammeter monitors the amperage of the pump.

14 Claims, 6 Drawing Sheets

(56) References Cited

U.S. PATENT DOCUMENTS

| | | | |
|---|---|---|---|
| 2002/0130137 A1* | 9/2002 | Greenwald | A47J 31/467 |
| | | | 222/54 |
| 2005/0126401 A1 | 6/2005 | Streeter et al. | |
| 2006/0292012 A1* | 12/2006 | Brudevold | A47J 31/402 |
| | | | 417/53 |
| 2007/0186780 A1* | 8/2007 | Clark | A47J 31/057 |
| | | | 99/275 |
| 2014/0069279 A1* | 3/2014 | Upston | A47J 31/24 |
| | | | 99/283 |

* cited by examiner

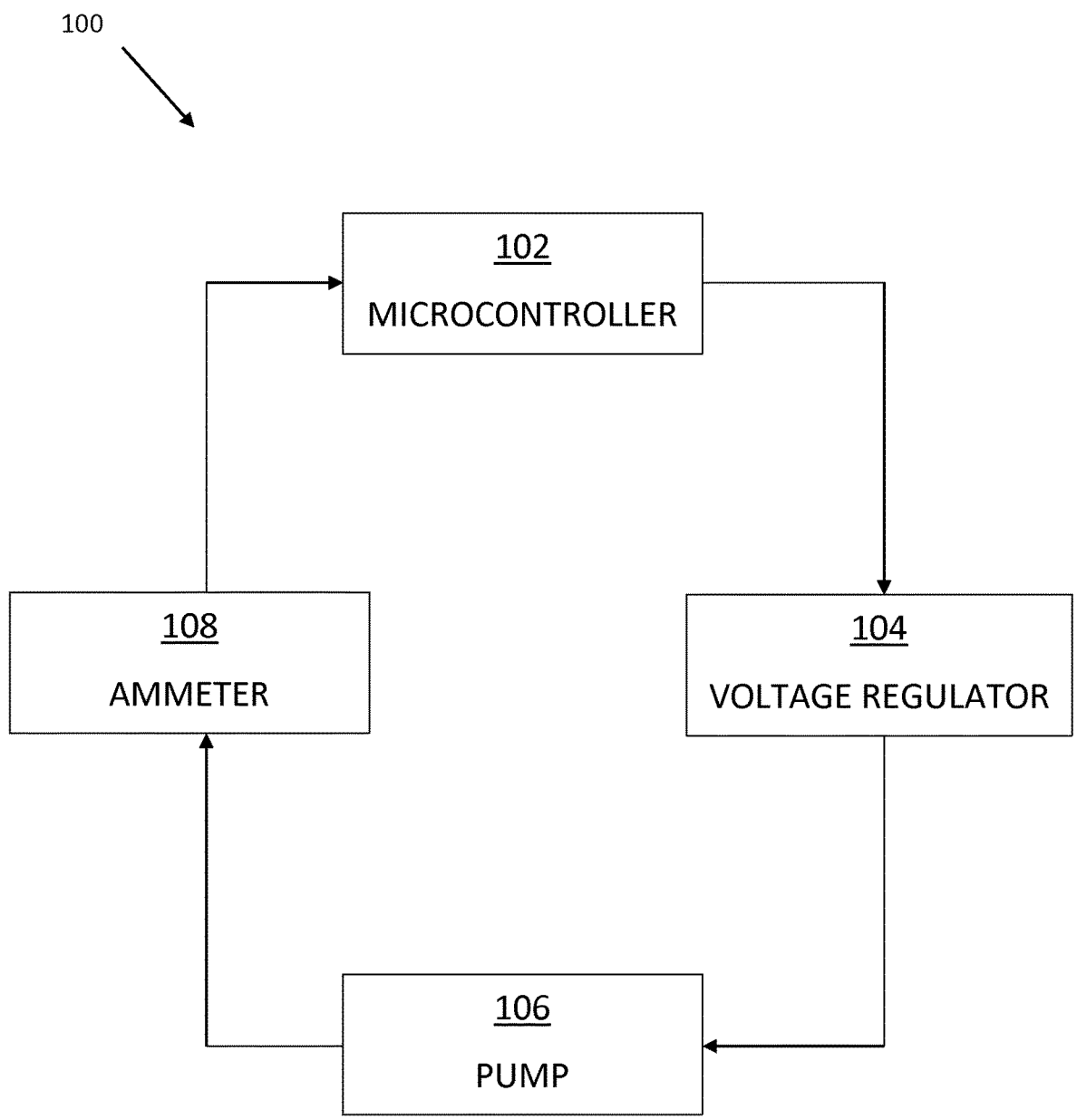

DEVICES AND METHODS FOR BEVERAGE BREWER REGULATION

CROSS-REFERENCE TO RELATED APPLICATIONS

This application claims the benefit of U.S. Patent Application No. 62/112,627, filed Feb. 5, 2015, entitled "METHODS FOR BEVERAGE BREWER REGULATION," and U.S. Patent Application No. 62/199,941, filed Jul. 31, 2015, entitled "DEVICES AND METHODS FOR BEVERAGE BREWER PRESSURE REGULATION," each of which is fully incorporated by reference herein in its entirety.

BACKGROUND

Field

The present disclosure pertains generally to devices and methods for regulating pressure within a brew cartridge.

Description of the Related Art

In recent years, single serve beverage brewers (e.g., those made by Keurig Green Mountain, Inc., of Waterbury, Vt.) have become popular among consumers. Typically, single serve beverage brewers include a pump that displaces ambient temperature water from a reservoir to a heater tank for the heating thereof. The heated water is then delivered to a beverage formation chamber, such as a brew head. The beverage formation chamber is configured to hold a single serve beverage container, pod, or cartridge (hereinafter referred to generically as a "cartridge") containing a beverage medium for mixing with the heated water, such as coffee grounds. The coffee grounds can be held within, above, or on a filter within the cartridge. Within the beverage formation chamber, the cartridge can be sandwiched between top and bottom pieces of the brew head such that an inlet needle attached to the top piece pierces the lid of the cartridge and an outlet needle pierces the bottom of the cartridge without piercing the filter. Heated water then runs through the inlet needle into the cartridge, where it is mixed with the coffee grounds to form a brewed beverage (e.g., coffee). Pressurization within the cartridge will force the brewed beverage through the cartridge filter (with the filter catching the beverage medium, such as coffee grounds) and out the outlet needle such that the beverage is dispensed.

As described above, one of the last steps of the brewing process in such machines involves pressurization within the cartridge. Adequate pressurization and liquid flow within the cartridge are important to ensure effective operation. Underpressurization and/or too low of a flow to the cartridge can result in inadequate mixing of the heated water and beverage medium and/or reduced output flow. Overpressurization can also have negative results. For instance, overpressurization can result in the filter within the cartridge detaching from the cartridge walls (i.e. "blowing out"), resulting in beverage medium such as coffee grounds being dispensed along with the beverage. An even more undesirable result of overpressurization can be the rupture of the cartridge itself, which can result not only in coffee grounds exiting the system with the beverage, but can also create a mess within the brew head.

Overpressurization can be the result of many different factors. One primary factor can be the overheating (and thus overexpansion) of water. Such overheating can occur under many conditions, and in some prior art machines this can occur if the water in the heater tank is at a colder temperature at the beginning of a brew cycle, such as ambient (instead of, for example, a pre-heated temperature such as 140° F.). The brewer may realize the relatively cold state of the water and immediately endeavor to rapidly heat the water in the heater tank, operating at its highest power to emit the most heat possible in an effort to reduce total beverage preparation time. However, this rapid heating can cause a water temperature overshoot—even after the heater is turned off. Both before and after heater turn-off, the thermal system of the heater, heater tank, and water therein moves toward equilibrium through the transfer of heat from the heater to the heater tank and water (and other transfers, such as from the heater tank to the water). When the heater is turned off, no more energy (i.e., heat) will be added to the thermal system. However, practically speaking, the system will never reach equilibrium during the brew cycle while the heater is operating; the water will be at a temperature lower than the heater during and immediately after heater operation. Thus, after heater turn-off, the water temperature will continue to rise while the system moves toward equilibrium. This continued heating, and overheating in general, will cause water being pumped to the cartridge to expand in volume. This expanded volume can result in overpressurization within the cartridge, and the possibility of the negative results previously described.

SUMMARY

The present disclosure describes methods and apparatuses controlling pressure in a brewing system.

A method for controlling pressure in a brewing system during a brew cycle in accordance with an aspect of the present disclosure comprises reading a temperature of a fluid in a heater tank and selectively activating a heater element in the heater tank based at least in part on the temperature reading. The method further comprises determining if the temperature of the fluid in the heater tank has reached a desired temperature, and displacing the fluid in the heater tank with additional fluid from a reservoir by pumping the additional fluid with a pump. The method also comprises measuring a current drawn by the pump, comparing the measured current drawn by the pump to a threshold current, and selectively changing a voltage supplied to the pump to displace a desired amount of fluid in the heater tank.

An apparatus in accordance with an aspect of the present disclosure comprises sensor for reading a temperature of a fluid in a heater tank and means, coupled to the sensor, for selectively activating a heater element in the heater tank based at least in part on the temperature reading. Such an apparatus also comprises means, coupled to the sensor, for determining if the temperature of the fluid in the heater tank has reached a desired temperature and a pump for displacing the fluid in the heater tank with additional fluid from a reservoir. Such an apparatus further comprises means for measuring a current drawn by the pump, means for comparing the measured current drawn by the pump to a threshold current, and means for selectively changing a voltage supplied to the pump to displace a desired amount of fluid in the heater tank.

The above summary has outlined, rather broadly, some features and technical advantages of the present disclosure in order that the detailed description that follows may be better understood. Additional features and advantages of the disclosure will be described below. It should be appreciated by those skilled in the art that this disclosure may be readily utilized as a basis for modifying or designing other structures for carrying out the same or similar purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further features and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

FIG. 2 is a flow diagram of one embodiment of a feedback loop according to an aspect of the present disclosure;

DETAILED DESCRIPTION

Figure 1:
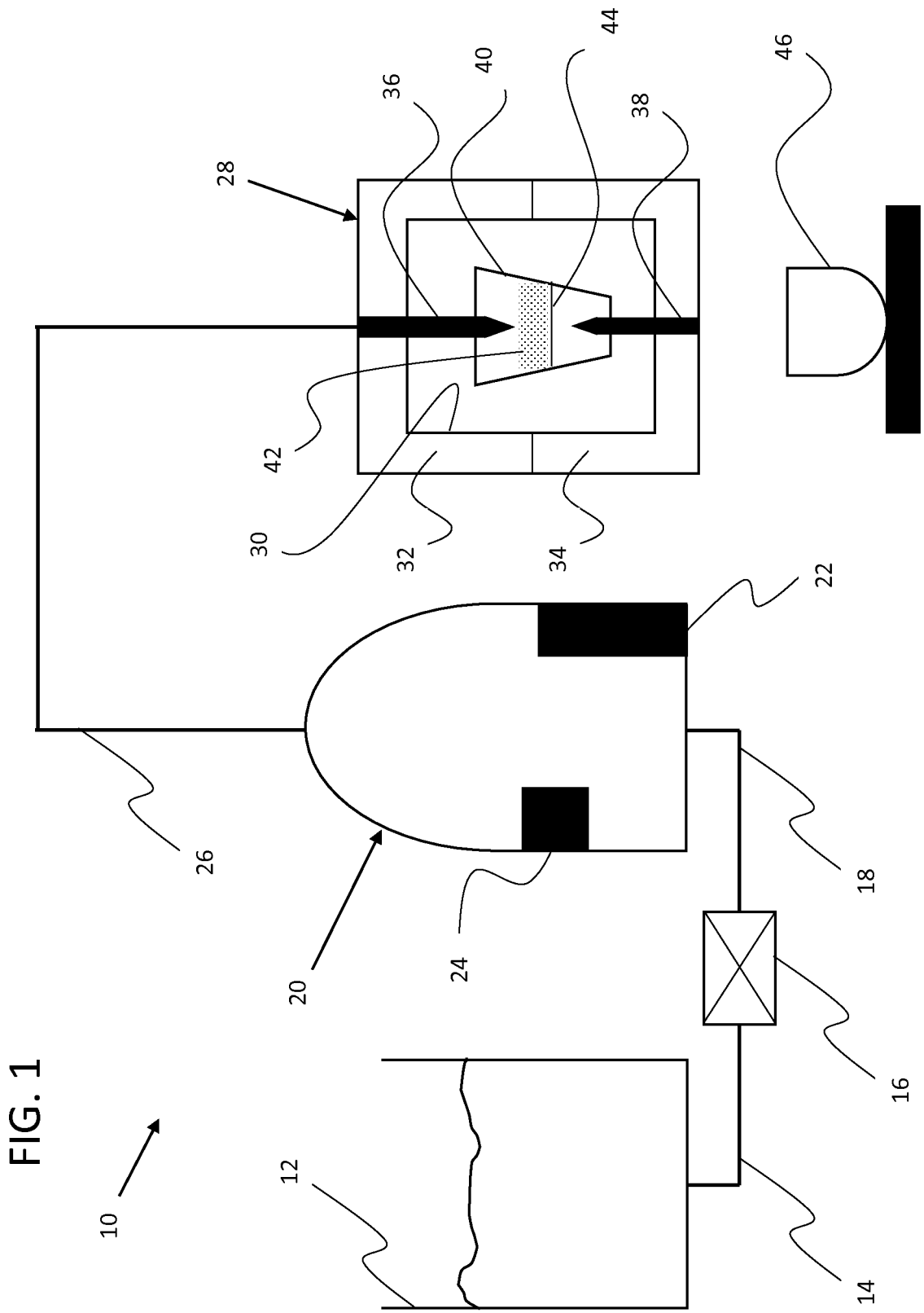
FIG. 1 is a schematic view of one embodiment of a beverage brewer according to an aspect of the present disclosure.

The present disclosure is directed toward brewing devices and methods for controlling pressure, and preventing or lessening overpressurization, within a brew cartridge. Many prior art devices and methods can result in overpressurization within the brew cartridge, which itself can result in the filter in the cartridge structurally failing (e.g. "blowing out"). This failure can result in the dispensing of an undesirable amount of solids with the desired liquid from the cartridge. Another potential result of overpressurization is the structural failure of the cartridge itself, which can result in liquid and solid within the brew head outside of the cartridge, requiring clean-up efforts and endangering users.

Embodiments of methods according to the present disclosure can utilize different system measurements to detect an overpressurization and prevent the above negative results. The amount of current drawn by a brewer pump is an indicator of pressure, as the pump must draw more current to overcome the higher pressure. A microcontroller or other device can receive pump current readings from an ammeter and make a determination as to whether current level is above or below a desirable current or current range. The microcontroller can then adjust pump voltage, which in turn adjusts the volume of water pumped. If overpressurization is occurring, this feedback loop can adjust the pump voltage to lessen the amount of liquid being pumped, thus addressing the pressure issue. Similarly, if underpressurization is occurring, the pump voltage can be adjusted.

Embodiments of other methods according to the present disclosure can include remedial action taken in order to prevent or lessen the chance of failure due to overpressurization, or alternatively to prevent or lessen the effects of failure. For example, upon overpressurization, a microcontroller can immediately reduce or cut off power to the brewer heating element. In another method, once a "point of no return" has been crossed and failure is inevitable or likely, the brewer can lock the brew head closed for a period of time until danger—such as pressure within the brew head or hot water loose in the brew head—is lessened or eliminated. Many different embodiments utilizing various preventative measures are possible.

Embodiments of devices according to the present disclosure can include components to prevent the overpressurization situations described above. One such component is a pressure regulator bypass. Under normal operating conditions, liquid will flow from the pump through an open solenoid valve, bypassing a conduit branch including a pressure regulator. However, upon detection of overpressurization, the solenoid valve can close and force liquid through the pressure regulator, thus directly reducing the brewer system pressure and lessening the chance of cartridge failure due to overpressurization.

Embodiments of further methods according to the present disclosure can address one primary cause of cartridge overpressurization—namely, overheating of water within the brewer heater tank. Prior art methods may heat liquid within the tank until it is at or near the desired brewing temperature. However, even after heating element shut-off, heat continues to transfer from the heating element and heater tank to the water. This can cause overheating and thus overexpansion of the water. One embodiment of a method according to the present disclosure utilizes a servo loop and, in one embodiment, a PD controller in order to lessen or prevent one or both of 1) overshoot of a desired temperature, and 2) settling time (i.e., the amount of time until the liquid is at or consistently near the desired temperature).

The present disclosure is described herein with reference to certain embodiments, but it is understood that the disclosure can be embodied in many different forms and should not be construed as limited to the embodiments set forth herein. In particular, the present disclosure is described below in regards to certain modules having features in different configurations, but it is understood that the present disclosure can be used for many other modules and/or configurations. The modules and systems can also have many different shapes beyond those described below.

All physical dimensions, weights, temperatures, etc. in the description and attached drawings are exemplary in nature. It is understood that embodiments of the present disclosure can have various dimensions/weights/temperatures/etc. varying from those shown in the attached drawings.

It is also understood that when a feature or element may be referred to as being "on" another element, it can be directly on the other element or intervening elements may also be present unless specifically stated otherwise. Furthermore, relative terms such as "inner", "outer", "upper", "above", "lower", "beneath", and "below", and similar terms, may be used herein to describe a relationship of one element or attribute to another. With regard to the figures, it is understood that these terms are intended to encompass different orientations of the device in addition to the orientation depicted.

Although the terms first, second, etc. may be used herein to describe various elements, components, regions, and/or sections, these elements, components, regions, and/or sections should not be limited by these terms. These terms are only used to distinguish one element, component, region, or section from another region, or section. Thus, a first module, element, component, region, or section discussed below could be termed a second module, element, component, region, or section without departing from the teachings of the present disclosure.

Embodiments of the disclosure are described herein with reference to cross-sectional view illustrations that are schematic illustrations of embodiments of the disclosure. As such, the actual dimensions of elements can be different, and variations from the shapes of the illustrations as a result, for example, of manufacturing techniques and/or tolerances are expected. Embodiments of the disclosure should not be construed as limited to the particular shapes of the regions illustrated herein but are to include deviations in shapes that result, for example, from manufacturing. A region illustrated or described as square or rectangular may have slightly rounded or curved features due to normal manufacturing tolerances. Thus, the regions illustrated in the figures are schematic in nature and their shapes are not intended to illustrate the precise shape of a region of a device and are not intended to limit the scope of the disclosure. It is understood that the shapes, sizes, and locations in the attached figures may not be to scale.

FIG. 1 is a schematic view of a brewer 10 according to one embodiment of the present disclosure. While the term "brewer" is used generically herein, it is understood that this term can include machines for the formation of any type of liquid, such as hot and cold brewed beverages, non-brewed beverages, soups, etc. Further, the brewer 10 can include many different components and features not shown in FIG. 1. Some of these components and features are described, for example, in PCT Pat. App. No. PCT/US15/15971 to Burrows, filed Feb. 13, 2015 and entitled "Beverage Brewer and Related Methods for Brewing Beverages"; U.S. Provisional Pat. App. No. 62/136,258 to Burrows, filed Mar. 20, 2015 and entitled "Coffee Brewing System and Method of Using the Same"; PCT Pat. App. No. PCT/US15/25013 to Burrows, filed Apr. 8, 2015 and entitled "Beverage Brewing Systems and Method for Using the Same"; PCT Pat. App. No. PCT/US15/45146 to Burrows, filed Aug. 13, 2015 and entitled "Moving Inlet Nozzles in Beverage Systems"; and PCT Pat. App. No. PCT/US15/54312 to Burrows, filed Oct. 6, 2015 and entitled "Beverage Brewing Systems and Methods for Using the Same"; each of which is fully incorporated by reference herein in its entirety.

The brewer 10 can include a reservoir 12 which can store water for use by the brewer. The reservoir 12 can be connected to a pump 16 via a first conduit 14. The pump 16 can be connected to a heater tank 20 via a second conduit 18. In alternative embodiments, the pump can instead be attached to the reservoir or in many other locations, and the specific embodiment shown in FIG. 1 should not be considered limiting.

The heater tank 20 can include one or more heating elements 22 therein or connected thereto, as well as a temperature sensor 24 such as a thermistor. Typically, hotter water will rise above colder water, meaning that colder water in the heater tank 20 will be below hotter water. As such, it can be advantageous to include the heating element 22 at a lower position in relation to the heater tank 20 such that it is heating colder water.

The heater tank 20 can be connected to a brew head 28 via a third conduit 26, although other embodiments are possible. The brew head 28 can include a brew chamber 30 therein. Top and bottom components 32, 34 of the brew head 28 can include needles 36, 38 (which themselves contain one or more conduits) attached thereto; it is understood that the term "needle" is used generically herein, and many different piercing devices or other devices can be used. In the specific embodiment shown, the top needle 36 is an inlet needle and the bottom needle 38 is an outlet needle, and will be referred to as such throughout herein, although many different locations for inlet and outlet needles according to the present disclosure are possible.

One or both of the top and bottom components 32,34 can be movable in order to place the brew head 28 in an "open" position, where the brew chamber 30 is exposed. When the brew head 28 is open, a user can insert a cartridge 40 into the brew chamber 30. A typical embodiment of the cartridge 40 can contain brew medium 42 (e.g., coffee grounds) and a filter 44. In one embodiment, the bottom component 34 is stationary and the top component 32 is opened to expose the brew chamber 30. When the user places the cartridge 40 into position, the outlet needle 38 can pierce the bottom of the cartridge 40. The user can then close the brew head 28 by replacing the top component 32; upon such replacement, the inlet needle 36 can pierce the top of the cartridge 40. Many other embodiments are possible; for example, in one embodiment the cartridge 40 is not pierced by either of the needles 36, 38 until the brew head 28 is closed. In another embodiment, both the top and bottom components 32, 34 open and close. The above specific embodiments should not be considered to be limiting. A liquid reception area can be beneath the brew head 28, and a receptacle 46 can be placed in the reception area to receive liquid from the brew head 28.

In a typical embodiment of a brewer according to the present disclosure, after the first use of the brewer "out-of-the-box," a volume of water sufficient for one brew cycle (i.e., one operation of the brewer resulting in a serving of liquid being dispensed) will remain within the heater tank 20. During periods of non-use of the brewer 10, this water may cool. In some embodiments, the heating element 22 may keep the water in the heater tank 20 at a pre-heated temperature (e.g., 140° F.) for a period of time or permanently. In one embodiment, the water in the heater tank 20 may be permitted to reach ambient temperature. The water will also be at or near ambient temperature during the first "out-of-the-box" fill of the heater tank 20. In any case, it is very often true that upon initiation of a brew cycle the water in a heater tank may need to be heated in order to brew the medium within a cartridge sufficiently. As previously described, under certain circumstances the water may become overheated and increase in volume beyond a desired point even after the heating element 22 is turned off. In one embodiment, this can be partially or wholly caused by a delay in temperature reading due to the sensor 24. For instance, in some cases a thermistor may cause a delay of 10 seconds or even more, meaning that by the time the desired temperature is recognized by the system, it has in reality been exceeded.

The brewer 10 can include a controller such as a microcontroller 102 therein, the microcontroller 102 being shown schematically in FIG. 2. The microcontroller 102 can serve many different functions. For example, in one embodiment, the microcontroller serves to regulate the power provided to the heating element 22 based on information provided by the temperature sensor 24. Many different functions are possible.

Microcontrollers according to embodiments of the present disclosure can provide functionality that can prevent or lessen the chance of overpressurization or underpressurization of a cartridge. FIG. 2 shows a feedback loop 100 designed to regulate the voltage provided to a pump 106, which can be similar to or the same as the pump 16 from FIG. 1. The voltage provided to the pump 106 in a brewer relates to the amount of work performed by the pump (e.g., in one example, the higher the voltage, the higher the pump torque); the amount of work performed similarly relates to the volume of fluid displaced. Thus, an increase in voltage results in more fluid displacement from the pump 106, while a decrease in voltage results in less fluid displacement. Because pressure in the cartridge 40 is directly related to the volume of water pumped therein, regulating the voltage to the pump 106 can regulate the amount of pressure in the cartridge 40.

According to an aspect of the present disclosure, the microcontroller 102 can use amperage readings to effectively regulate pump voltage and, thus, cartridge pressure. An ammeter 108 can measure the amount of current drawn by the pump 106, and transmit this information to the microcontroller 102. The microcontroller can use this information to determine how the current level relates to desired threshold current value(s), which will be discussed in more detail below with regard to FIGS. 3A and 3B. The microcontroller 102 can then use this information to determine a desired voltage, and send a signal with this information to a voltage regulator 104. The voltage regulator 104 can modify an input voltage provided by a power supply based upon the signal from the microcontroller 102. This modified voltage can then be delivered to the pump 106, thus altering the volume of fluid being displaced. Readings by the ammeter 108 can be taken at many different intervals depending upon the specificity of control desired, with an appropriate reading frequency being about every tenth of a second. Thus, by taking readings of the current drawn by the pump 106, the voltage to the pump 106 can be controlled in order to adjust the amount of fluid displacement from the pump 106, which relates directly to the pressure within the cartridge 40.

Figure 3A:
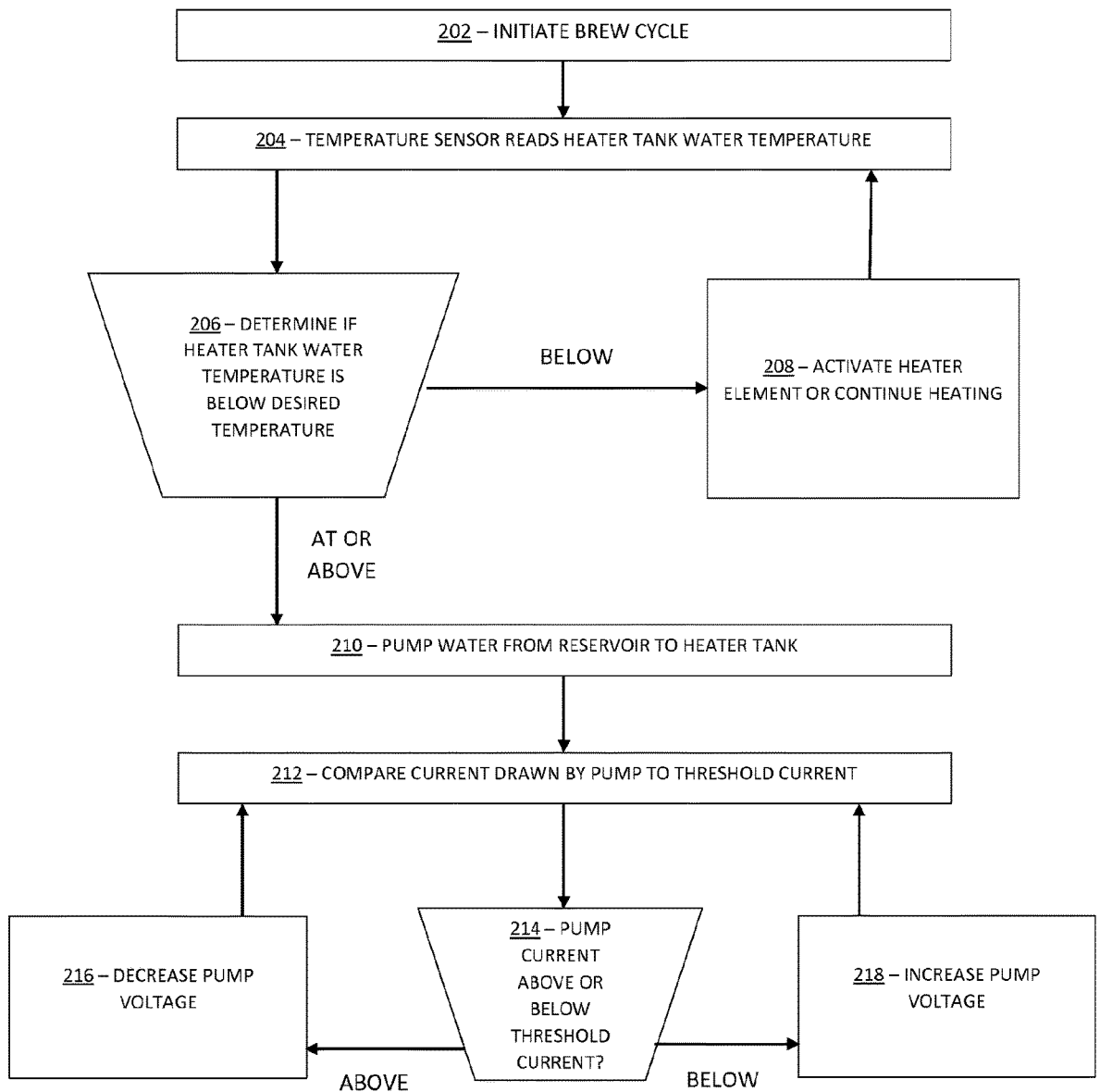
FIG. 3A is a flow diagram of one embodiment of a brew cycle according to an aspect of the present disclosure.

FIG. 3A shows one embodiment of a brew cycle 200 including cartridge pressure regulation according to an aspect of the present disclosure. The brew cycle 200 can take place in, for example, a brewer similar to or the same as the brewer 10 from FIG. 1, and can include a feedback loop similar to or the same as the feedback loop 100 from FIG. 2. Upon a brew cycle being initiated in the step 202, such as by a user pressing a button, in the step 204 a temperature sensor such as the temperature sensor 24 from FIG. 1 can read the temperature of water in a heater tank, such as the heater tank 20. If the water in the heater tank is below a desired temperature as determined in the step 206, one or more heating elements such as the heating element 22 can be activated in the step 208 or, if already activated, can continue heating. The step 204 can continue to take place, such as continuously or at a desired frequency, until the sensor determines that the water in the heater tank is at (or above) the desired temperature. Upon reaching (or exceeding) the desired temperature, in the step 210 water can be pumped from a reservoir, such as the reservoir 12 from FIG. 1, to the heater tank, which can cause displacement of the water within the heater tank from the heater tank to the cartridge. The water can be pumped by, for example, a pump similar to or the same as the pump 16 from FIG. 1.

Upon the beginning of pumping in the step 210, a feedback loop similar to or the same as the feedback loop 100 from FIG. 2 can begin. In the step 212, the current being drawn by the pump can be measured, such as using an ammeter, and this reading can be sent to a microcontroller. This current reading can vary based on a number of different factors, including but not limited to the brew cartridge pressure (higher current being related to higher pressure, since the pump must overcome more pressure). In the step 214, the current can be compared to a threshold current to determine if it is higher or lower than the threshold, the threshold current being a predetermined value above which overpressurization may occur and under which underpressurization may occur. This comparison can be done by the microprocessor. Many different threshold currents can be used, with one appropriate threshold current being approximately 225 mA. The threshold current can also be varied throughout different parts of the brew cycle, such as those described in PCT Pat. App. No. PCT/US15/25013 to Burrows. The threshold current can also vary depending upon the type of cartridge used; for instance, in one embodiment a sensor can determine the type of cartridge in the brew head, and the threshold current(s) can be adjusted accordingly, such as by a microcontroller.

If the current is determined to be above the threshold in the step 214, the voltage supplied to the pump can be reduced in the step 216, such as by a voltage regulator. Alternatively, if the current is determined to be below the threshold in the step 214, the voltage supplied to the pump can be increased in the step 218. This process can then repeat itself beginning with the step 212. In one embodiment, this process repeats during the entire or nearly the entire time over which the pump is operating.

Figure 3B:
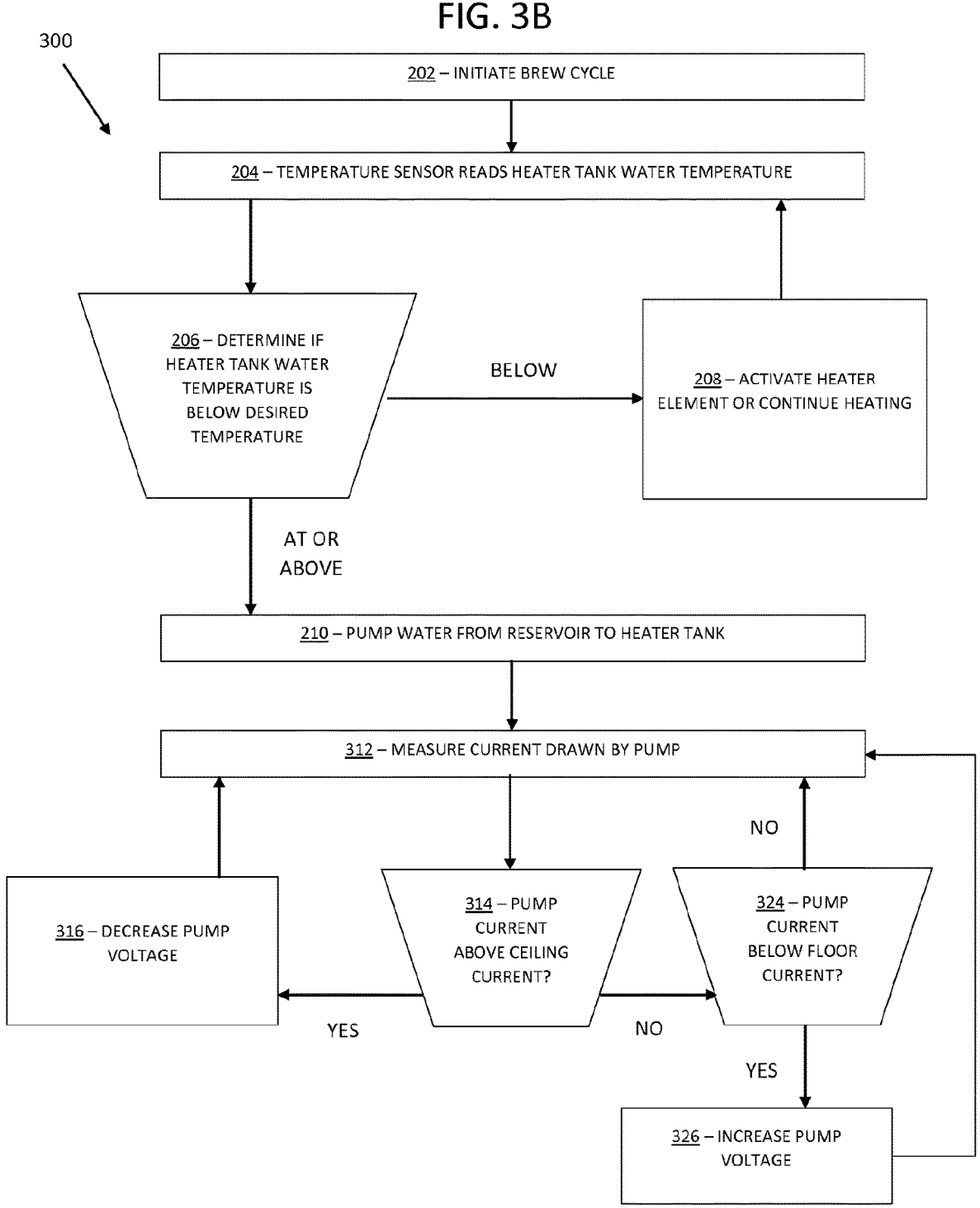
FIG. 3B is a flow diagram of another embodiment of a brew cycle according to an aspect of the present disclosure.

FIG. 3B shows another embodiment of a brew cycle 300 including cartridge pressure regulation according to the present disclosure. The brew cycle 300 is similar in many respects to the brew cycle 200 from FIG. 3A, with equivalent indicator numerals representing equivalent steps. The brew cycle 300 can include the steps 200-210 described with regard to FIG. 3A, but can include a different feedback loop which can allow for a range of acceptable currents which may not require a voltage adjustment.

In the step 312, the current being drawn by the pump can be measured, such as using an ammeter, and this reading can be sent to a microcontroller. In the step 314, the current can be compared to a predetermined ceiling value. If the current is above the ceiling value, the voltage regulator can reduce the pump voltage in the step 316, and the feedback loop can be restarted at the step 312. If the current is below the ceiling value, then another comparison of the current can be made; namely, the current can be compared to a predetermined floor value in the step 324. If the current is above the floor value, then the feedback loop can be restarted at the step 312 without a voltage adjustment being made. If the current is below the floor value, then the voltage regulator can increase the pump voltage in the step 326, and the feedback loop can be restarted in the step 312. Many different ceiling and floor current values can be used, with one example having a ceiling current of 235 mA and a floor current of 215 mA, although many different values and ranges are possible. The ceiling current and/or the floor current can also be varied throughout different parts of the brew cycle, such as those described in PCT Pat. App. No. PCT/US15/25013 to Burrows. Also similar to the above embodiment, ceiling and floor currents can be varied based on cartridge.

The voltage adjustment described above can be made using any method known in the art, such as, for example, pulse width modulation (PWM) or regulation of the duty cycle. Furthermore, embodiments of the present disclosure can use either alternating current (AC) or direct current (DC).

While the above embodiments describe cartridge pressure regulation via pump voltage adjustment based on the current being drawn by the pump, pressure regulation according to the present disclosure can be based on many other factors. An overpressurization of the cartridge can be detected based on trigger events other than the amount of current being drawn by the pump. For example, in one embodiment a pressure transducer is used to measure pressure directly. In another embodiment, a drop in flowrate of liquid out of the cartridge can indicate a pressure build-up within the cartridge. Many different methods of detection are possible.

Systems according to the present disclosure can use one or more measurements in an effort to recognize a trigger event which can indicate the possibility or inevitability of cartridge failure in order to take remedial action. Different characteristics of the system, such as cartridge pressure, current drawn by the pump, pump voltage, etc., can vary throughout a brew cycle. However, this variance is typically expected and can be represented as a function of time. Systems according to the present disclosure can measure a system characteristic and compare the value of the characteristic to the expected value. If the characteristic value varies from the expected value (e.g., output flow from the cartridge is lower than expected, or current drawn by the pump is higher than expected) by a predetermined amount, then the system can take remedial action in an effort to prevent cartridge failure due to overpressurization.

In one embodiment according to the present disclosure, the reaching of a characteristic threshold (a "first" threshold) can indicate the possibility of a cartridge failure. Upon reaching this first threshold, the system can take remedial action in an effort to prevent cartridge failure. Some exemplary remedial actions include the shutting down of the system heating elements, such as the heating element 22 of FIG. 1, or a reduction in pump voltage (or stoppage of the pump) in order to cause a reduction in pressure build-up. Many other remedial actions, including combinations thereof, are possible, and can prevent and/or lessen the risk of cartridge failure.

Systems according to the present disclosure can also take remedial action upon the reading of a failure threshold, such as a failure flowrate threshold and/or a failure pressure threshold. Such action can be in addition to the remedial actions described above, or can stand alone. A failure threshold as discussed herein can be reached, for example, if a cartridge has already failed, or if the measured characteristic indicates that the system has reached a "point of no return" such that failure is imminent and practically or completely unavoidable. Different systems may define a "failure threshold" differently, and the above examples should not be considered limiting.

Upon reaching a failure threshold, the system can react. In one embodiment, the brew head of a brewer, such as the brew head 28 from FIG. 1, is locked and cannot be opened by a user for a period of time. For example, U.S. Provisional Pat. App. No. 62/136,258 to Burrows describes the use of a safety solenoid which can lock a brew head in a closed position. Locking a brew head can prevent a user from opening the brew head during or after failure for a predetermined or calculated period of time during which the danger posed by opening the brew head can dissipate. For example, the pressure within the brew head can be permitted to bleed off, such as through an outlet needle such as the outlet needle 38 from FIG. 1. The locking time of the system can be predetermined, or can be based upon a measured value such as pressure within the brew head such that the brew head will not open until such opening is relatively safe.

Figure 4:
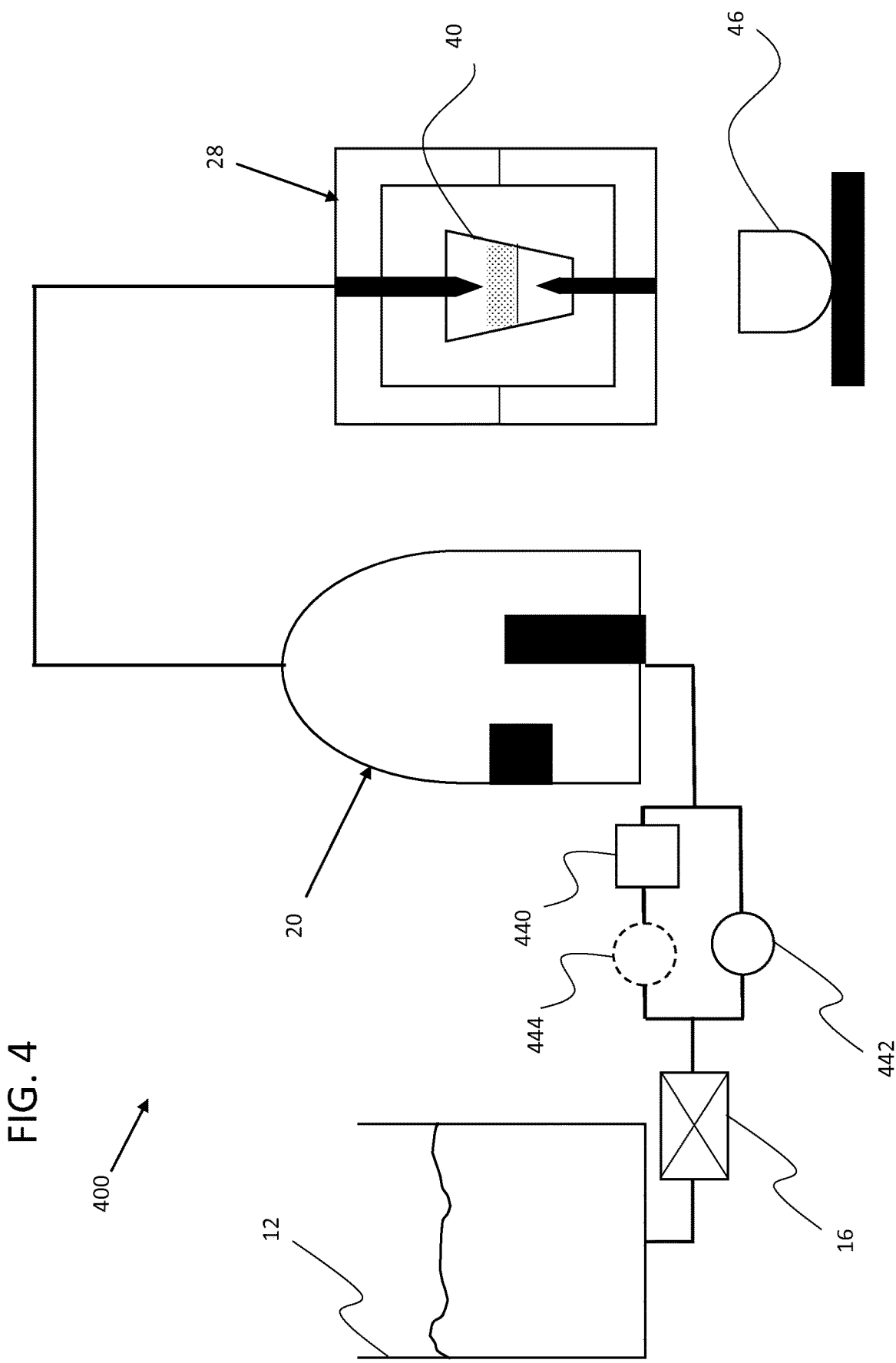
FIG. 4 is a schematic view of another embodiment of a beverage brewer according to an aspect of the present disclosure.

Another form of remedial action according to the present disclosure can involve a pressure regulator bypass. FIG. 4 shows a brewer 400 that can contain many components that are similar to or the same as the brewer 10 from FIG. 1, although other embodiments including the pressure regulator bypass described herein are possible. The brewer 400 can also include a pressure regulator 440 and a solenoid 442. In the embodiment shown, the pressure regulator 440 and solenoid 442 are located between the pump 416 and the heater tank 420, although other embodiments are possible.

The pressure regulator 440 and the solenoid 442 can be arranged in parallel, although other embodiments are contemplated. In one embodiment, the pressure regulator 440 and solenoid 442 are arranged such that when the solenoid 442 is open, all or substantially all of the water from the pump 416 passes through the open solenoid 442 and not the pressure regulator 440, and when the solenoid 442 is closed, all or substantially all of the water from the pump 416 passes through the pressure regulator 440. An alternative embodiment can include a second solenoid 444 which can either allow or block flow through the branch including the pressure regulator 440. The second solenoid 444 could typically be closed, and could open simultaneously with or nearly simultaneously with the closure of the first solenoid 442.

Bypassing the pressure regulator 440 can allow for adequate pressure in nearly all situations, while use of a pressure regulator can sometimes result in underpressurization under certain conditions. For example, a pressure of 3 psi produces a satisfactory brew time for a typical cartridge, but at 3 psi brew time can double for a reusable cartridge overpacked with beverage medium by a user. As previously stated, in one embodiment all or substantially all flow bypasses the pressure regulator 440, such as through an open solenoid such as the solenoid 442. However, upon the recognition by the system of a certain characteristic threshold such as a first or failure threshold described above, the brewer 400 can take remedial action by closing the solenoid 442 such that all or substantially all flow thereafter from the pump 416 is forced through the pressure regulator 440. The pressure regulator 440 can then control the flow such that system pressure drops to an acceptable and safe level, such as, for example, 3 psi. This remedial action can prevent or lessen the possibility of the previously described cartridge failures.

Embodiments of the present disclosure can use other systems and methods for the regulation of cartridge pressure. One such embodiment can include regulation of a heating element in order to control the heating—and thus volume expansion—of water within a heater tank. As previously described, especially in situations where the water within a heater tank is at a relatively low temperature, heating of the water can result in temperature overshoot such that the water reaches a temperature higher than that desired, which can result in the overpressurization of the cartridge. This can be due to, for example, a delay in feedback from a thermistor, such that when system recognizes the water in the heater tank as being at the desired temperature, it has actually already surpassed this temperature. Another potential cause of overshoot previously described is the heat transferred to the water after heating element shut-off, which is not taken into account by many prior art systems. Many different causes are possible.

One embodiment of the present disclosure can utilize a servo loop, which can correct for the overheating of water in the heater tank. A microcontroller, which in one embodiment can be the same microcontroller described above with regard to other functionality, can serve as a proportional-integral-derivative controller (PID controller) and/or a proportional-derivative controller (PD controller). It is noted that other types of controllers, such as a PI controller, are possible. The proportional ("P") value in such controllers is typically dependent upon the actual error between the measured temperature and the desired temperature, while the derivative ("D") value is typically dependent upon the rate of change in the characteristic being measured.

One specific embodiment of the present disclosure utilizes a PD microcontroller. Thus, both a P value and a D value are used to determine the amount of power to the heating element. As the measured temperature nears the desired temperature, the P value gets smaller, which can result in lower power values to the heating element. When the D value is recognized as being positive (i.e., change in temperature is positive), the power to the heating element can be reduced. This reduction can be in an amount related to the actual D value (e.g., with a larger D value, a large power reduction can be made, and with a smaller D value, a small power reduction can be made). Similarly, a negative D value can result in more power being sent to the heating element.

The use of a D term in addition to a P term has a distinct advantage in that it can eliminate or reduce oscillation about the desired temperature; this oscillation can be disadvantageous. The use of the PD microcontroller in this manner can result in critical damping wherein the temperature of the water within the tank more smoothly approaches the desired temperature 1) with a reduced (if any) overshoot of the desired temperature, and/or 2) reduced settling time to a nearly constant or practically constant temperature.

Figure 5:
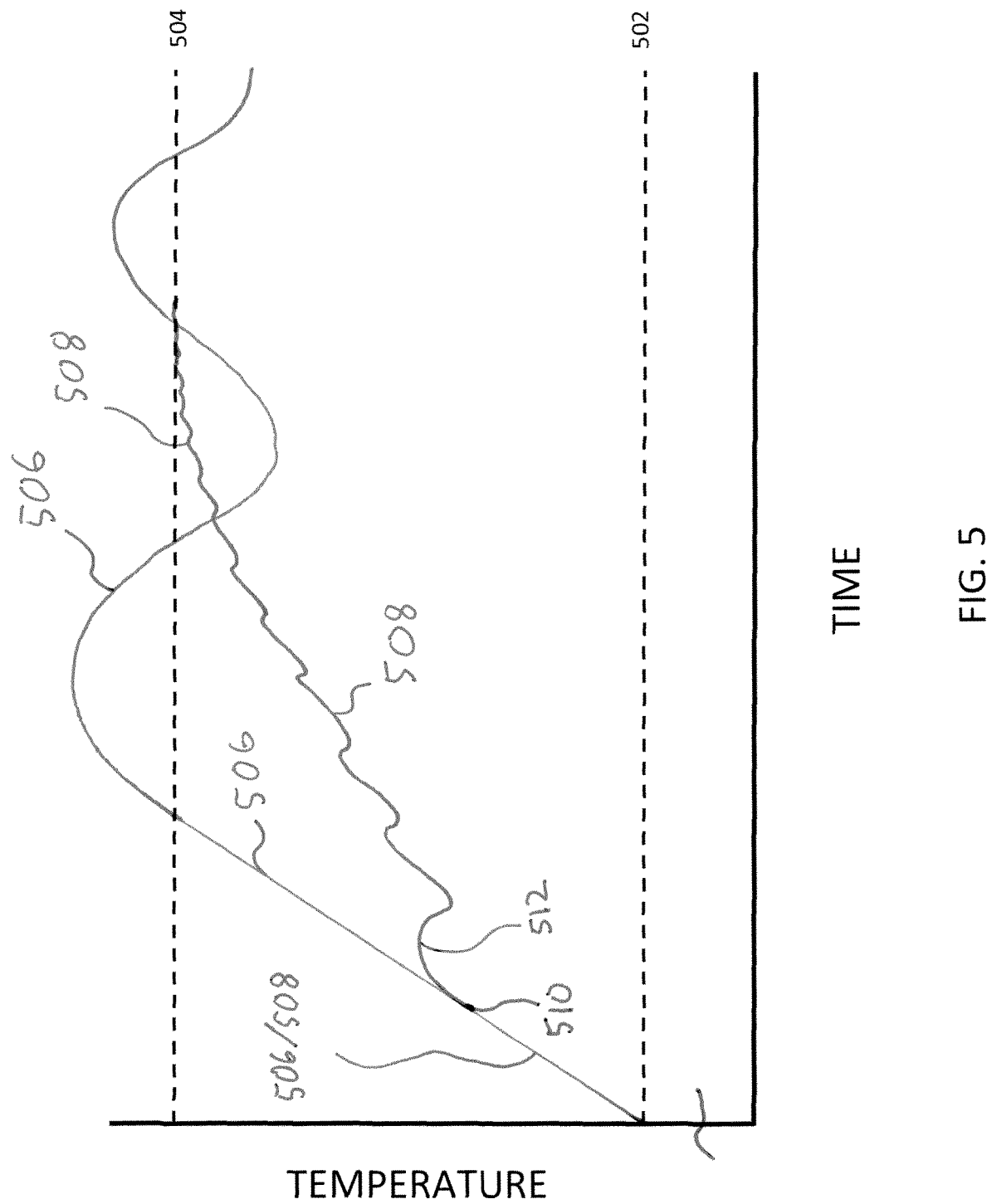
FIG. 5 is a graph comparing a prior art heating method to one embodiment of a heating method according to an aspect of the present disclosure.

FIG. 5 shows a graphical comparison between a prior art heating method and a heating method according to one embodiment of the present disclosure, with the line 502 representing a starting temperature below the desired temperature, and the line 504 representing the desired temperature. A prior art heating method is represented by the line 506. As shown by the prior art line 506, in a prior art embodiment power to the heating element is not cut or reduced until a sensor recognizes that the water temperature is at the desired temperature (which, as previously described, may even be after a sensor delay time, meaning that the water is actually already above the desired temperature). The water temperature then greatly overshoots the desired temperature, and power will not be added to the heating element again after the sensor recognizes a temperature below the desired temperature. This method results both in a large overshoot and increased settling time.

A heating method according to one embodiment of the present disclosure is represented by the line 508. Upon recognizing a large D value at the point 510, power to the heating element can be reduced, resulting in a reduction in the D value until the D value becomes zero at the local maximum shown by the point 512 and negative for a period thereafter (in some embodiments, the D value does not become negative, but instead only reaches zero). After the D value becomes negative, the microcontroller can again power the heating element, resulting in the recovery of the D value to a positive value. In another embodiment, this action can be taken when the D value approaches zero or is zero. This process can be repeated as temperature approaches the desired temperature. Further, the overall magnitude of the power increase and reduction to the heating element can be reduced as the temperature gets closer to the desired temperature—i.e., as the P value is reduced. As shown, this process results in a reduced and/or minimal overshoot and reduced settling time.

It is understood that embodiments presented herein are meant to be exemplary. Embodiments of the present disclosure can comprise any combination of compatible features shown in the various figures, and these embodiments should not be limited to those expressly illustrated and discussed.

Although the present disclosure has been described in detail with reference to certain configurations thereof, other versions are possible. Therefore, the spirit and scope of the disclosure should not be limited to the versions described above.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The steps of a method or algorithm described in connection with the disclosure may be embodied directly in hardware, in a software module executed by a processor, or in a combination of the two. A software module may reside in RAM, flash memory, ROM, EPROM, EEPROM, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can include RAM, ROM, EEPROM, CD-ROM or other optical disk storage, magnetic disk storage or other magnetic storage devices, or any other medium that can be used to carry or store specified program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

Although the present disclosure and its advantages have been described in detail, it should be understood that various changes, substitutions and alterations can be made herein without departing from the technology of the disclosure as defined by the appended claims. For example, relational terms, such as "above" and "below" and/or "inside" and "outside" are used with respect to a specific device. Of course, if the device is inverted, above becomes below, and vice versa. Additionally, if oriented sideways, above and below may refer to sides of a device. Further, reference to "first" or "second" instances of a feature, element, or device does not indicate that one device comes before or after the other listed device. Reference to first and/or second devices merely serves to distinguish one device that may be similar or similarly referenced with respect to another device.

Moreover, the scope of the present application is not intended to be limited to the particular configurations of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed that perform substantially the same function or achieve substantially the same result as the corresponding configurations described herein may be utilized according to the present disclosure. Accordingly, the appended claims are intended to include within their scope such processes, machines, manufacture, compositions of matter, means, methods, or steps.

The description of the disclosure is provided to enable any person skilled in the art to make or use the disclosure. Various modifications to the disclosure will be readily apparent to those reasonably skilled in the art, and the generic principles defined herein may be applied to other variations without departing from the spirit or scope of the disclosure. Thus, the present disclosure is not intended to be limited to the examples and designs described herein but is to be accorded the widest scope consistent with the principles and novel features disclosed herein. Accordingly, the disclosure is not to be limited by the examples presented herein, but is envisioned as encompassing the scope described in the appended claims and the full range of equivalents of the appended claims.

What is claimed is:

1. A method for controlling pressure in a brewing system during a brew cycle, comprising:
   reading a temperature of a fluid in a heater tank;
   selectively activating a heater element in the heater tank based at least in part on the temperature reading;
   determining if the temperature of the fluid in the heater tank has reached a desired temperature;
   displacing the fluid in the heater tank with additional fluid from a reservoir by pumping the additional fluid with a pump;
   measuring a current drawn by the pump;
   comparing the measured current drawn by the pump to a threshold current, in which the threshold current is based at least in part on a desired pressure in the brewing system; and
   selectively changing a voltage supplied to the pump to displace a desired amount of fluid in the heater tank.

2. The method of claim 1, wherein the voltage supplied to the pump is reduced when the measured current is above the threshold current.

3. The method of claim 1, wherein the voltage supplied to the pump is increased when the measured current is below the threshold current.

4. The method of claim 1, wherein the voltage is selectively changed by a microcontroller.

5. The method of claim 4, wherein the microcontroller is selected from a group comprising a proportional controller, an integrating controller, a derivative controller, and a combination of proportional, integrating, and derivative controllers.

6. The method of claim 1, wherein the threshold current is a variable threshold current.

7. The method of claim 6, wherein the variable threshold current is varied during the brew cycle.

8. The method of claim 6, wherein the variable threshold current is based, at least in part, on a type of cartridge used in the brewing system.

9. The method of claim 6, wherein the variable threshold current is based, at least in part, on a brew cartridge pressure.

10. The method of claim 1, wherein the temperature of the fluid in the heater tank is measured while the pump is operating.

11. The method of claim 10, wherein the temperature is measured at a plurality of times while the pump is operating.

12. The method of claim 11, wherein the voltage is selectively controlled by a voltage regulator.

13. The method of claim 12, wherein the voltage regulator is controlled by a microcontroller.

14. The method of claim 13, wherein the microcontroller is selected from a group comprising a proportional controller, an integrating controller, a derivative controller, and a combination of proportional, integrating, and derivative controllers.

* * * * *